United States Patent
Nagasaki

(10) Patent No.: US 11,108,668 B2
(45) Date of Patent: Aug. 31, 2021

(54) SERVER, NON-TRANSITORY COMPUTER-READABLE MEDIUM STORING COMPUTER-READABLE INSTRUCTIONS FOR SERVER AND NON-TRANSITORY COMPUTER-READABLE MEDIUM STORING COMPUTER-READABLE INSTRUCTIONS FOR TERMINAL DEVICE

(71) Applicant: BROTHER KOGYO KABUSHIKI KAISHA, Nagoya (JP)

(72) Inventor: Takeshi Nagasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/908,881

(22) Filed: Jun. 23, 2020

(65) Prior Publication Data
US 2020/0403895 A1   Dec. 24, 2020

(30) Foreign Application Priority Data
Jun. 24, 2019   (JP) .............................. JP2019-116581

(51) Int. Cl.
*H04L 12/26* (2006.01)
*H04L 12/24* (2006.01)
(Continued)

(52) U.S. Cl.
CPC ........ *H04L 43/0876* (2013.01); *G06F 3/1236* (2013.01); *H04L 12/40123* (2013.01);
(Continued)

(58) Field of Classification Search
CPC ........ G06F 3/1229–1238; G06F 3/1253–1259; G06F 3/126; G06F 3/1268–1271;
(Continued)

(56) References Cited

U.S. PATENT DOCUMENTS

| | | | |
|---|---|---|---|
| 7,003,568 B1 * | 2/2006 | Chikada | H04L 47/193 709/224 |
| 2011/0060822 A1 * | 3/2011 | Fan | H04L 43/0811 709/224 |
| 2016/0212570 A1 * | 7/2016 | Wu | H04W 24/04 |

FOREIGN PATENT DOCUMENTS

JP   2001-034121 A   2/2001

* cited by examiner

*Primary Examiner* — Brendan Y Higa
(74) *Attorney, Agent, or Firm* — Scully, Scott, Murphy & Presser, PC

(57) ABSTRACT

A server may include: a processor; and a memory storing computer-readable instructions therein, wherein the computer-readable instructions, when executed by the processor, cause the server to: receive operation information of a communication device and setting information from the communication device repeatedly, the setting information indicating a setting for the communication device to communicate with the server; and in a case where the server is not capable of receiving the operation information and the setting information from the communication device, send an execution instruction for executing a specific process to a terminal device being different from the communication device, the specific process including the terminal device receiving, from the server, first setting information which the server most recently received from the communication device, and sending the first setting information to the communication device.

15 Claims, 10 Drawing Sheets

(51) Int. Cl.
*H04L 12/707* (2013.01)
*H04L 12/703* (2013.01)
*H04L 12/40* (2006.01)
*G06F 3/12* (2006.01)

(52) U.S. Cl.
CPC ...... *H04L 41/0672* (2013.01); *H04L 41/0806* (2013.01); *H04L 43/0817* (2013.01); *H04L 45/22* (2013.01); *H04L 45/28* (2013.01)

(58) Field of Classification Search
CPC ... G06F 3/1284–1296; H04L 12/40123; H04L 41/0654–0672; H04L 41/08–0836; H04L 43/08–0817; H04L 45/22; H04L 45/28; H04L 69/40
See application file for complete search history.

(Registration and Shipping Service)

SERVER, NON-TRANSITORY COMPUTER-READABLE MEDIUM STORING COMPUTER-READABLE INSTRUCTIONS FOR SERVER AND NON-TRANSITORY COMPUTER-READABLE MEDIUM STORING COMPUTER-READABLE INSTRUCTIONS FOR TERMINAL DEVICE

CROSS-REFERENCE TO RELATED APPLICATION

This application claims priority to Japanese Patent Application No. 2019-116581 filed on Jun. 24, 2019, the contents of which are hereby incorporated by reference into the present application.

TECHNICAL FIELD

The description herein discloses an art related to communicating operation information of a communication device between a server and the communication device.

DESCRIPTION OF RELATED ART

A service provision center capable of periodically acquiring a count value from a copier and identifying a timing to supply a consumable article for the copier is known. In an event where communication between the copier and the service provision center is interrupted, the service center notifies this communication interruption to an operator in charge of its service-providing area.

SUMMARY

In the technique described above, an occurrence of the communication interruption is notified to the operator, and the operator can take measures against the occurrence of the communication interruption. However, the service provision center cannot receive the count value from the copier during a period from the occurrence of the communication interruption until a state capable of executing the communication is recovered by the operator.

The description herein provides an art which, in a case where a server becomes incapable of receiving operation information from a communication device, enables to restart receiving the operation information at an early stage.

A server disclosed herein may comprise: a processor, and a memory storing computer-readable instructions therein, wherein the computer-readable instructions, when executed by the processor, cause the server to: receive operation information of a communication device and setting information from the communication device repeatedly, the setting information indicating a setting for the communication device to communicate with the server, and in a case where the server is not capable of receiving the operation information and the setting information from the communication device, send an execution instruction for executing a specific process to a terminal device being different from the communication device, the specific process including the terminal device receiving, from the server, first setting information which the server most recently received from the communication device, and sending the first setting information to the communication device.

Moreover, a non-transitory computer-readable medium storing computer-readable instructions for a terminal device is disclosed herein. The computer-readable instructions, when executed by a processor of the terminal device, may cause the terminal device to: in a case where a server is not capable of receiving operation information of a communication device being different from the terminal device and setting information from the communication device after the server has received the operation information and the setting information from the communication device repeatedly, the setting information indicating a setting for the communication device to communicate with the server; receive an execution instruction for executing a specific process from the server; and in a case where the execution instruction is received from the server, execute the specific process in accordance with the execution instruction, the specific process including receiving, from the server, first setting information which the server most recently received from the communication device and sending the first setting information to the communication device.

A control method implemented by the server, a computer program for the server and a non-transitory computer-readable medium storing computer-readable instructions for the server are also novel and useful. Moreover, the above terminal device itself, and a computer program for the terminal device are also novel and useful. Moreover, a communication system comprising the above server and the above terminal device is also novel and useful.

EMBODIMENTS

Figure 1:
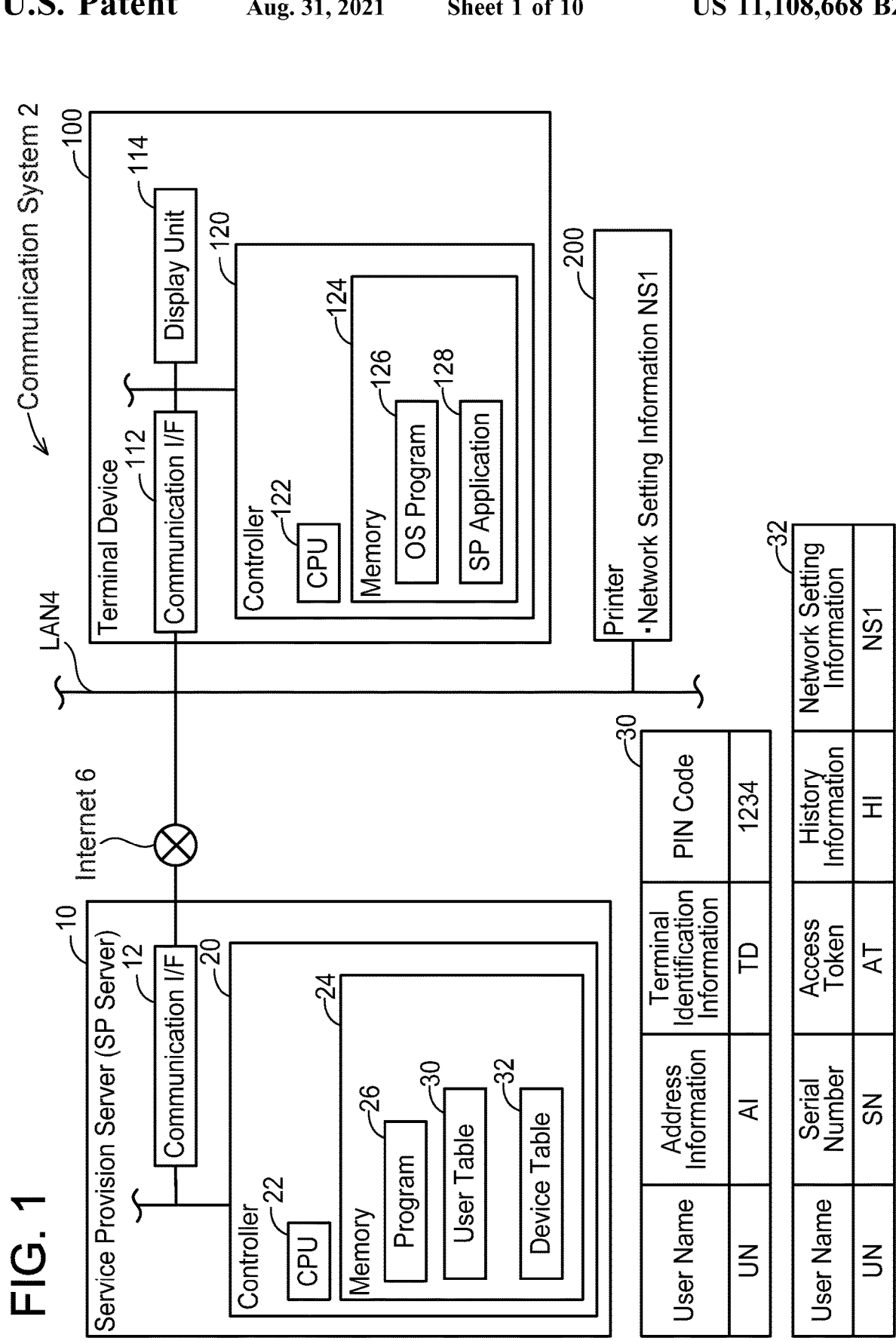
FIG. 1 shows a configuration of a communication system.

First Embodiment (Configuration of Communication System 2; FIG. 1)

As shown in FIG. 1, a communication system 2 is provided with a service provision server 10 (hereinbelow termed "SP server 10"), a terminal device 100, and a printer 200. The terminal device 100 and the printer 200 are connected to a same local area network (LAN) 4. The LAN 4 may be a wired LAN or a wireless LAN. Further, the LAN 4 is connected to the Internet 6. Devices belonging to the LAN 4 (such as 100) are capable of communicating with the SP server 10 provided on the Internet 6 through the LAN 4 and the Internet 6. A plurality of printers (not shown) including the printer 200 is provided on the LAN 4.

The printer 200 is a peripheral device capable of executing print function (that is, the peripheral device of the terminal device 100). The printer 200 stores network setting information NS1. The network setting information NS1 indicates a setting for the printer 200 to communicate with the SP server 10 through the Internet 6. The network setting information NS1 may include a flag "allowed" indicating that communication through the Internet 6 is allowed and information indicating a setting (such as an IP address of a proxy server) of the proxy server (not shown). The network setting information NS1 is inputted to the printer 200 by a user. In a case where the LAN 4 is a wireless LAN, the network setting information NS1 may further include a service set identifier (SSID) of an access point constituting the LAN 4, an authentication scheme, and a password, for example.

(Configuration of SP Server 10)

The SP server 10 is a server configured to collect information on the printers (such as 200), and is configured to provide services according to the information to users of the printers. The SP server 10 is provided on the Internet 6 by a vendor of the printer 200 for example. In a variant, the SP server 10 may be provided on the Internet 6 by an entity different from the vendor.

The SP server 10 includes a communication interface 12 and a controller 20. Hereinbelow, an interface will be denoted "I/F". The communication I/F 12 is an interface configured to execute wired or wireless communication. The communication I/F 12 is connected to the Internet 6. The controller 20 is provided with a CPU 22 and a memory 24. The CPU 22 is configured to execute various processes according to a program 26 stored in the memory 24. The memory 24 is constituted of volatile memory, non-volatile memory and/or the like.

The memory 24 further stores a user table 30 and a device table 32. The user table 30 has one or more user names stored therein. Each user name is associated with address information indicating an address of the user, terminal identification information that identifies a terminal device (such as 100) used by this user, and a personal identification number (PIN) code. The PIN code is used in a registration process to be described later (see FIG. 2).

The device table 32 has one or more serial numbers stored therein. Each serial number is a number for identifying a printer (such as 200). Each serial number is associated with a user name, an access token, history information, and network setting information.

The access token is information for executing communication between the SP server 10 and its corresponding printer (such as 200). Especially in the present embodiment, in order to enable the SP server 10 on the Internet 6 to send a request to the printer beyond a firewall of the LAN 4 to which the printer belongs without receiving a request from the printer, an extensible messaging and presence protocol (XMPP) connection is established between the SP server 10 and the printer. In a variant, a hypertext transfer protocol secure (HTTPS) connection may be established instead of the XMPP connection. The history information indicates a history of a remaining amount of ink in an ink cartridge that is currently mounted on the printer. The remaining amount in the history information and the network setting information are periodically sent from each of the printers.

(Configuration of Terminal Device 100)

The terminal device 100 is a user terminal such as a desktop personal computer (PC), a notebook PC, and a portable terminal. The terminal device 100 is provided with a communication I/F 112, a display unit 114, and a controller 120. The communication I/F 112 is connected to the LAN 4. The display unit 114 is a display configured to display various types of information. The display unit 114 also functions as a so-called touch panel. That is, the display unit 114 functions as an operation unit as well.

The controller 120 is provided with a CPU 122 and a memory 124. The CPU 122 is configured to execute various processes according to programs 126, 128 stored in the memory 124. The memory 124 is constituted of volatile memory, non-volatile memory and/or the like. The memory 124 stores an operating system (OS) program 126 for realizing basic processes and a SP application program 128 (hereinbelow termed "SP application 128").

The SP application 128 is a program provided by the vendor of the SP server 10, and is a program for using services provided by the SP server 10. The SP application 128 is installed in the terminal device 100 from a server (not shown) provided on the Internet 6 by the vendor.

Figure 2:
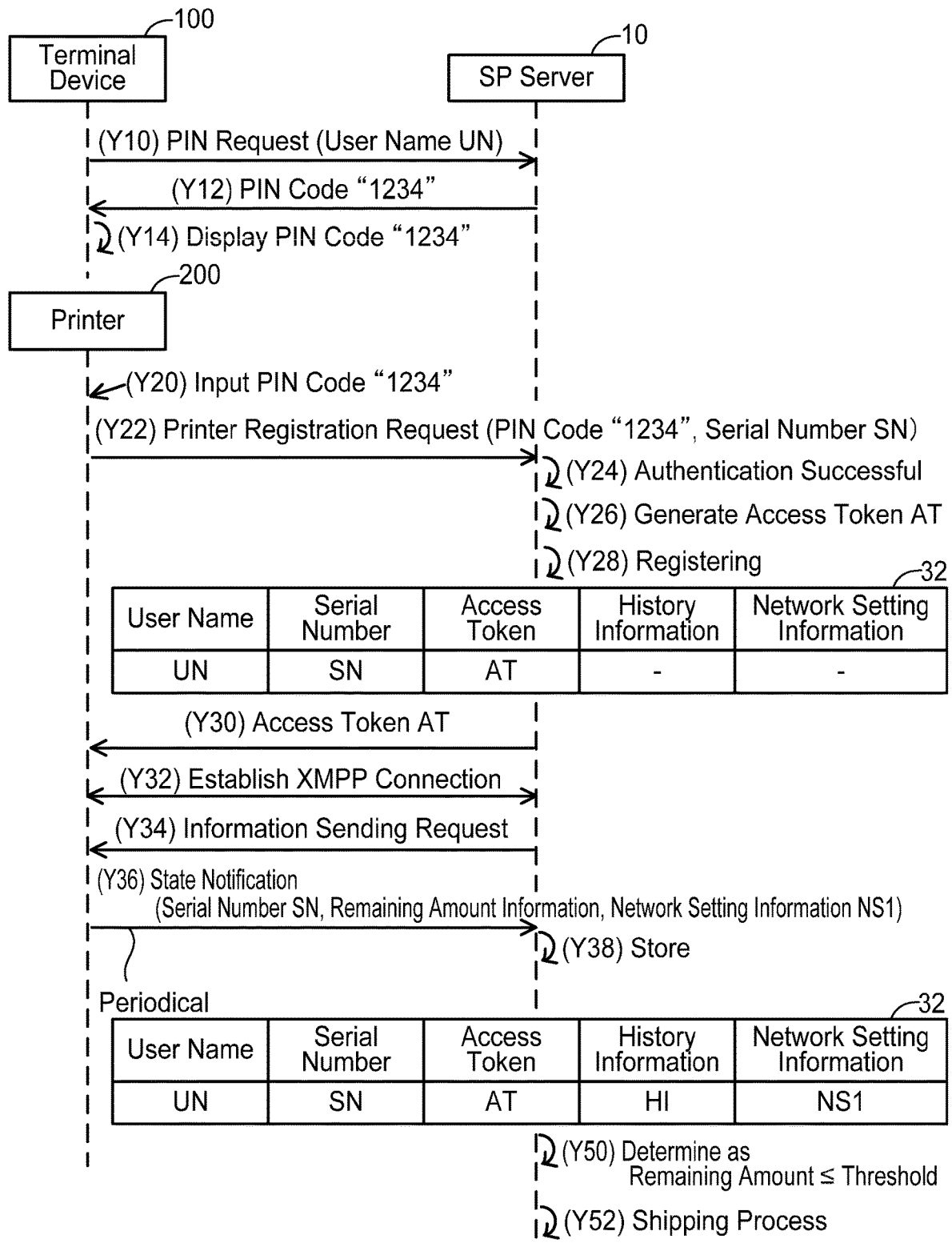
FIG. 2 shows a sequence diagram of registration and shipping service.

(Registration and Shipping Service; FIG. 2)

A process of registering the serial number and the like to the device table 32 and a process of providing a shipping service using information in the device table 32 will be described with reference to FIG. 2. Prior to the explanation on these processes, preparation to be performed by the user will be described. Firstly, the user installs the SP application 128 to the terminal device 100. Then, the user activates the SP application 128 and inputs its user name UN and address information AI to the terminal device 100. When the user name UN and the address information AI are inputted by the user, the terminal device 100 sends the user name UN, the address information A, and terminal identification information TD for identifying the terminal device 100 to the SP server 10. By doing so, the SP server 10 stores the user name UN, the address information AI, and the terminal identification information TD in the user table 30. Further, the SP server 10 generates a PIN code "1234" and stores the PIN code "1234" in association with the user name UN in the user table 30.

In Y10, the terminal device 100 sends a PIN request for requesting a PIN code to the SP server 10 in response to an operation by the user. The PIN request includes the user name UN.

When the PIN request is received from the terminal device 100 in Y10, the SP server 10 specifies the PIN code "1234" associated with the user name UN from the user table 30. Then, the SP server 10 sends the PIN code "1234" to the terminal device 100 in Y12.

When the PIN code "1234" is received from the SP server 10 in Y12, the terminal device 100 displays the PIN code "1234" on the display unit 114 in Y14. According to this, the user can acknowledge the PIN code "1234". Then, the user inputs the PIN code "1234" to the printer 200 in Y20.

When the input of the PIN code "1234" is accepted in Y20, the printer 200 sends a printer registration request requesting to register the serial number SN for identifying the printer 200 to the SP server 10 in Y22. The printer registration request includes the PIN code "1234" and the serial number SN.

When the printer registration request is received from the printer 200 in Y22, the SP server 10 executes authentication of the PIN code "1234" included in the printer registration request in Y24. In the present case, since the PIN code "1234" included in the printer registration request matches the PIN code "1234" in the user table 30, the SP server 10 determines that the authentication of the PIN code was successful and specifies the user name UN stored in association with the PIN code "1234" as a user name being a registration target. Then, in Y26, the SP server 10 generates an access token AT being a registration target.

In Y28, the SP server 10 registers the user name UN being the registration target, the serial number SN included in the printer registration request, and the access token AT being the registration target to the device table 32. In Y30, the SP server 10 sends the access token AT to the printer 200.

When the access token AT is received from the SP server 10 in Y30, the printer 200 uses the access token AT to establish the XMPP connection with the SP server 10 in Y32.

When the XMPP connection is established in Y32, the SP server 10 uses the XMPP connection to send an information sending request requesting to periodically send information related to a state of the printer 200 to the printer 200 in Y34.

When the information sending request is received from the SP server 10 in Y34, the printer 200 starts to periodically (that is, repeatedly) send a state notification related to the state of the printer 200 to the SP server 10 in Y36. The state notification includes the serial number SN of the printer 200, the remaining amount information indicating the remaining amount of the ink in the ink cartridge currently mounted on the printer 200, and the network setting information NS1 currently stored in the printer 200.

In each of the repeated reception of the state notifications from the printer 200, the SP server 10 stores information in the state notification (that is, the remaining amount information and the network setting information NS1) in the device table 32 in Y38. The remaining amount information is stored in the device table 32 as history information HI. Here, only the network setting information NS1 that was most recently received from the printer 200 is stored in the device table 32.

The SP server 10 provides a service of shipping an ink cartridge that can be mounted on the printer 200 to the user by using the history information HI in the device table 32. Specifically, the SP server 10 determines whether the remaining amount indicated by the most recent remaining amount information in the history information HI is equal to or less than a preset threshold (such as 10%). In the case shown in FIG. 2, the SP server 10 determines that the ink remaining amount is equal to or less than the threshold in Y50 and executes a process of Y52. Further, if it is determined that the ink remaining amount is greater than the threshold, the SP server 10 does not execute the process of Y52. A condition for determining whether to execute the process of Y52 may not be limited to a condition that the ink remaining amount is equal to or less than the threshold, and may include other conditions (such as a condition that an amount of change in the remaining amount calculated from a history of the remaining amount information is equal to or greater than a predetermined value).

In Y52, the SP server 10 executes a shipping process for shipping a new ink cartridge to be mounted on the printer 200. Specifically, firstly the SP server 10 specifies the address information AI stored in association with the history information HI from the user table 30 and the device table 32. Then, the SP server 10 ships the new ink cartridge to the address indicated by the specified address information AI.

Figure 3:
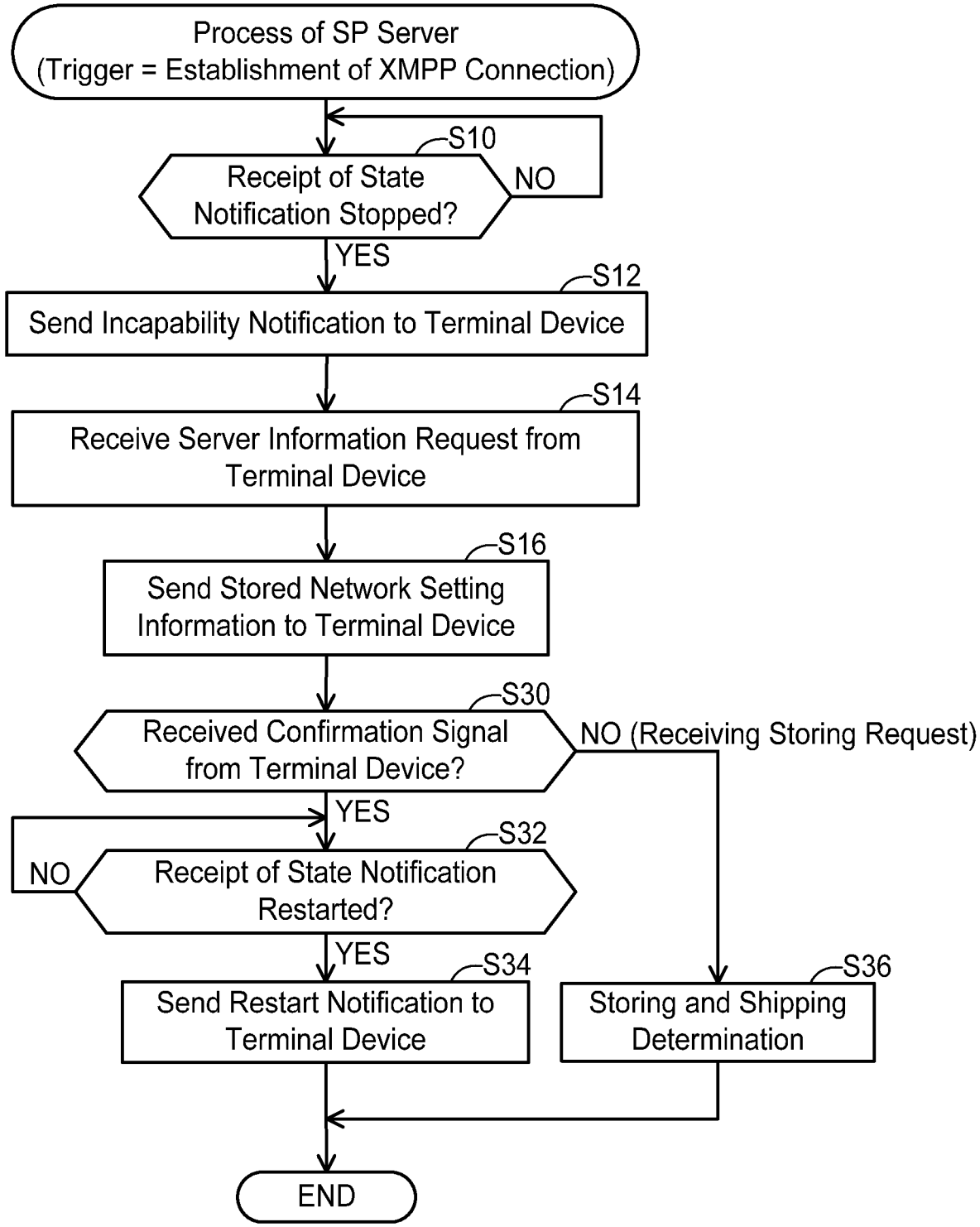
FIG. 3 shows a flowchart of process of a service provision server.

(Process of SP Server, FIG. 3)

Process executed by the CPU 22 of the SP server 10 will be described with reference to FIG. 3. The process of FIG. 3 is initiated with establishment of the XMPP connection with the printer 200 as a trigger.

The periodic reception of the state notification after the XMPP connection has been established (see Y36 of FIG. 2) may stop due to various reasons. For example, the periodic reception of the state notification stops when the user operates the printer 200 and changes a part of the network setting information NS1 of the printer 200 (such as the flag "allowed") to a different value (such as a flag "prohibited" indicating to prohibit the communication through the Internet 6). Further, for example, the periodic reception of the state notification stops also when the user operates a device (such as the terminal device) different from the printer 200 and changes the setting of the access point of the LAN 4.

In S10, the CPU 22 monitors interruption of the periodic reception of the state notification from the printer 200. Specifically, the CPU 22 determines that the periodic reception of the state notification from the printer 200 has stopped (YES to S10) in a case of not receiving a subsequent state notification even after a predetermined period has elapsed since when the state notification was most recently received from the printer 200, and proceeds to S12. Further, in another example, the CPU 22 determines that the printer 200 is no longer capable of executing communication through the Internet 6 in a case where the XMPP connection with the printer 200 is disconnected. Then, the CPU 22 assumes that the periodic reception of the state notification from the printer 200 will stop (YES to S10) and proceeds to S12.

In S12, the CPU 22 sends an incapability notification indicating that it is not capable of receiving the state notification from the printer 200 to the terminal device 100 through the communication I/F 12. The incapability notification includes the serial number SN of the printer 200 and the terminal identification information TD stored in association with the serial number SN.

In S14, in response to sending the incapability notification to the terminal device 100, the CPU 22 receives a server information request requesting the network setting information in the device table 32 from the terminal device 100 through the communication I/F 12. The server information request includes the serial number SN in the incapability notification.

In S16, the CPU 22 sends the network setting information NS1 stored in association with the serial number SN in the device table 32 (that is, the network setting information NS1 which the SP server 10 had most recently received from the printer 200) to the terminal device 100 through the communication I/F 12 according to the server information request. The terminal device 100 uses the network setting information NS1 received from the SP server 10 (that is, the setting by which the printer 200 can communicate with the SP server 10) and attempts to cause the printer 200 to restart periodic sending of the state notification. For example, in the case where the periodic reception of the state notification from the printer 200 had stopped due to the user having changed a part of the network setting information NS1 of the printer 200, the terminal device 100 sends the network setting information NS1 to the printer 200 by which it can cause the printer 200 to restart the periodic sending of the state notification by changing the network setting information of the printer 200 to the network setting information NS1. On the other hand, in a case where the periodic reception of the state notification from the printer 200 had stopped due to a reason other than the user having changed a part of the network setting information NS1 of the printer 200, the periodic sending of the state notification by the printer 200 cannot be restarted even if the network setting information NS1 is sent to the printer 200. In such a case, the terminal device 100 displays an error screen indicating that the periodic sending of the state notification by the printer 200 has stopped. Further, the terminal device 100 sends the current remaining amount information of the printer 200 to the SP server 10 on behalf of the printer 200. Due to this, even if the periodic sending of the state notification by the printer 200 cannot be restarted, the SP server 10 can store the current remaining amount information.

In S30, the CPU 22 determines whether a confirmation signal has been received from the terminal device 100 through the communication I/F 12. The confirmation signal is a signal for the terminal device 100 to confirm with the SP server 10 that the periodic reception of the state notification from the printer 200 has been restarted. The confirmation signal is a signal sent to the SP server 10 in the case where the network setting information NS1 is sent from the terminal device 100 to the printer 200. In a case of determining that the confirmation signal from the terminal device 100 has been received (YES to S30) the CPU 22 proceeds to S32.

In S32, the CPU 22 monitors restart of the periodic reception of the state notification from the printer 200. In a case where the periodic reception of the state notification from the printer 200 has been restarted (YES to S32), the CPU 22 proceeds to S34.

In S34, the CPU 22 sends a restart notification indicating that the periodic reception of the state notification from the printer 200 has been restarted to the terminal device 100 through the communication I/F 12. By doing so, the terminal device 100 displays a restart screen indicating that the periodic reception of the state notification from the printer 200 has been restarted. When S32 is completed, the process of FIG. 3 is terminated.

Further, in a case of determining that a storing request requesting to store the current remaining amount information is received from the terminal device 100 through the communication I/F 12 (NO to S30), the CPU 22 proceeds to S36. The storing request includes the current remaining amount information and the serial number SN. The storing request is a signal that is sent to the SP server 10 in a case where the network setting information NS1 was not sent from the terminal device 100 to the printer 200.

In S36, according to the received storing request, the CPU 22 stores the current remaining amount information included in the storing request as the history information HI associated with the serial number SN included in the storing request in the device table 32. Then, the CPU 22 executes the determination similar to Y50 of FIG. 2, and executes the shipping process similar to Y52 in a case of determining that the remaining amount indicated by the most recent remaining amount information in the history information HI is equal to or less than the threshold. When S36 is completed, the process of FIG. 3 is terminated.

Figure 4:
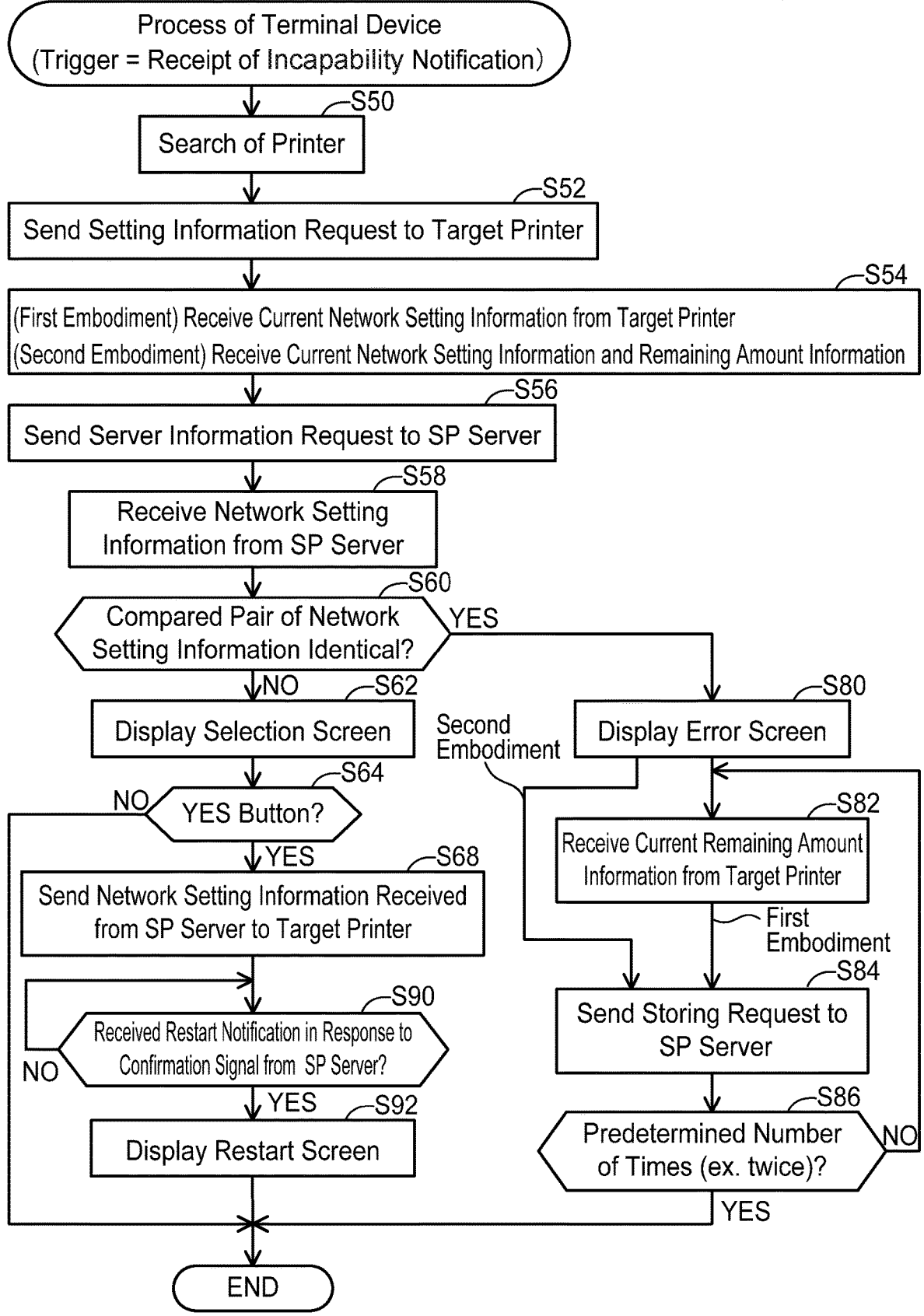
FIG. 4 shows a flowchart of process of a terminal device.

(Process of Terminal Device; FIG. 4)

Process executed by the CPU 122 of the terminal device 100 will be described with reference to FIG. 4. The process of FIG. 4 is initiated with the incapability notification being received from the SP server 10 (see S12 of FIG. 3) as a trigger. In other words, the incapability notification is an execution instruction for the process of FIG. 4.

In S50, the CPU 122 searches for printers connected to the LAN 4. Specifically, the CPU 122 sends a predetermined search signal by broadcast to the LAN 4 through the communication I/F 112. The CPU 122 receives a response signal from each of the plurality of printers belonging to the LAN 4, where each response signal includes the serial number identifying the corresponding printer and the IP address of this printer. Then, the CPU 22 specifies a response signal that includes a serial number which matches the serial number SN included in the incapability notification from among the plurality of response signals corresponding to the plurality of printers.

In S52, the CPU 122 sends a setting information request requesting the network setting information to the target printer identified by the IP address included in the specified response signal (that is, the printer 200) through the communication I/F 112.

In S54, the CPU 122 receives the network setting information that is currently stored in the target printer from the target printer through the communication I/F 112.

In S56, the CPU 122 sends the server information request to the SP server 10 through the communication I/F 112 (see S14 of FIG. 3).

In S58, the CPU 122 receives the network setting information NS1 which the SP server 10 has most recently received from the printer 200 from the SP server 10 through the communication I/F 112 (see S16 of FIG. 3).

In S60, the CPU 122 determines whether the network setting information received from the target printer and the network setting information NS1 received from the SP server 10 are identical. Here, this pair of network setting information being different means that the periodic reception of the state notification from the printer 200 has stopped due to the user having changed a part of the network setting information NS1 of the printer 200. Further, this pair of network setting information being identical means that the periodic reception of the state notification from the printer 200 has stopped due to a reason other than a part of the network setting information NS1 having been changed. In a case of determining that the pair of network setting information is different (NO to S60), the CPU 122 proceeds to S62.

In S62, the CPU 122 displays a selection screen for selecting whether to send the network setting information NS1 received from the SP server 10 to the target printer on the display unit 114. The selection screen includes a YES button indicating to send the network setting information NS1 to the target printer and a NO button indicating not to send the network setting information NS1 to the target printer.

In S64, the CPU 122 determines whether the YES button in the selection screen has been selected. The CPU 122 proceeds to S68 in a case of determining that the YES button has been selected (YES to S64) and in a case of determining that the NO button has been selected (NO to S64), it skips processes from S68 and terminates the process of FIG. 4. By allowing the user to select whether to send the network setting information NS1 to the target printer in the selection screen, the network setting information NS1 can be suppressed from being sent to the target printer against user's will.

In S68, the CPU 122 sends the network setting information NS1 received from the SP server 10 to the target printer through the communication I/F 112. By doing so, the target printer changes the currently stored network setting information to the network setting information NS1 received from the terminal device 100. Due to this, the periodic sending of the state notification by the printer 200 is restarted.

In S90, the CPU 122 sends the confirmation signal to the SP server 10 through the communication I/F 112 and monitors the receipt of the restart notification from the SP server 10 in response to the confirmation signal (see S30 to S34 of FIG. 3). In a case of receiving the restart notification from the SP server 10 (YES to S90), the CPU 122 proceeds to S92.

In S92, the CPU 122 displays a restart screen on the display unit 114. Due to this, the user can acknowledge that the periodic sending of the state notification by the printer 200 has been restarted. When S92 is completed, the process of FIG. 4 is terminated.

Further, in a case of determining that the pair of network setting information is identical (YES to S60), the CPU 122 displays an error screen on the display unit 114 in S80.

In S82, the CPU 122 sends a remaining amount request requesting the current remaining amount information to the target printer through the communication I/F 112 and receives the current remaining amount information from the target printer.

In S84, the CPU 122 sends the storing request including the current remaining amount information received from the target printer and the serial number for identifying the target printer (that is, the serial number SN) to the SP server 10 through the communication I/F 112 (see S30 of FIG. 3). Here, the processes of S82 and S84 are executed repeatedly just over a predetermined number of times (such as twice). After the processes of S82 and S84 are executed repeatedly over the predetermined number of times (YES to S86), the CPU 122 terminates the process of FIG. 4.

Figure 5:
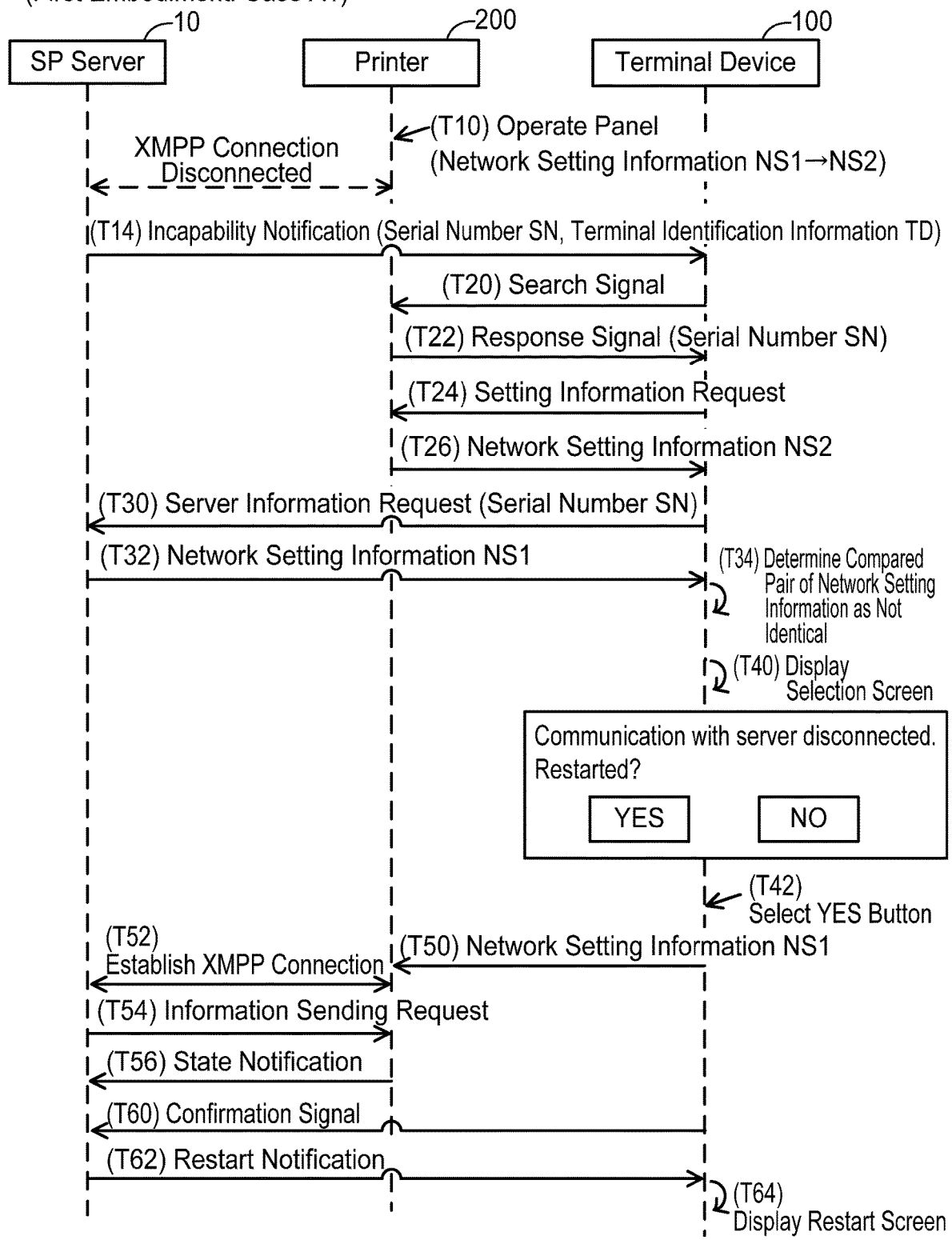
FIG. 5 shows specific Case A1 realized by the processes of FIGS. 3 and 4.

(Specific Case A1; FIG. 5)

Specific Case A1 realized by the processes of FIGS. 2 and 3 will be described with reference to FIG. 5. FIG. 5 is a continuation from FIG. 2.

In T10, the user operates the panel of the printer 200 and changes the flag "allowed" in the network setting information NS1 to the flag "prohibited". That is, the network setting information NS1 including the flag "allowed" is changed to network setting information NS2 including the flag "prohibited". Due to this, the printer 200 becomes incapable of executing communication through the Internet 6, by which the XMPP connection with the SP server 10 is disconnected and the periodic sending of the state notification can no longer be executed.

In T14, the SP server 10 determines that the periodic reception of the state notification from the printer 200 has stopped (YES to S10 of FIG. 2) and sends the incapability notification including the serial number SN and the terminal identification information TD to the terminal device 100 (S12).

When the incapability notification is received from the SP server 10 in T14, the terminal device 100 sends the search signal by broadcast to the LAN 4 in T20 (S50 of FIG. 4). The terminal device 100 receives the response signal from the printer 200 in T22.

In T24, the terminal device 100 sends the setting information request to the printer 200 (S52). In T26, the terminal device 100 receives the network setting information NS2 that is currently stored in the printer 200 from the printer 200 (S54).

In T30, the terminal device 100 sends the server information request including the serial number SN to the SP server 10 (S56).

When the server information request is received from the terminal device 100 in T30 (S14 of FIG. 3), the SP server 10 sends the network setting information NS1 stored in association with the serial number SN in the device table 32 to the terminal device 100 in accordance with the server information request (S16).

When the network setting information NS1 is received from the SP server 10 in T32 (S58 of FIG. 4), the terminal device 100 determines in T34 that the network setting information NS2 received from the printer 200 and the network setting information NS1 received from the SP server 10 are different (NO to S60).

In T40, the terminal device 100 displays the selection screen (S62). In T42, the terminal device 100 accepts selection of the YES button in the selection screen (YES to S64).

In T50, the terminal device 100 sends the network setting information NS1 received from the SP server 10 to the target printer (S68).

When the network setting information NS1 is received from the terminal device 100 in T50, the printer 200 changes the currently stored network setting information NS2 to the network setting information NS1. Due to this, the printer 200 re-establishes the XMPP connection with the SP server 10 in T52. When the XMPP connection is established, the SP server 10 uses the XMPP connection to send the information sending request to the printer 200 in T54. Then, the SP server 10 receives the state notification from the printer 200 in T56.

Further, when the confirmation signal is received from the terminal device 100 in T60 (YES to S30 and YES to S32 of FIG. 3) the SP server 10 sends the restart notification to the terminal device 100 in T62 (S34). Due to this, the terminal device 100 displays the restart screen in T64 (S92 of FIG. 4).

According to the present case, the SP server 10 becomes incapable of receiving the state notification from the printer 200 due to the user having changed the network setting information NS1 of the printer 200 to the network setting information NS2. In this case, the SP server 10 sends the incapability notification to the terminal device 100 (T14). Due to this, the terminal device 100 initiates the process of FIG. 4. Then, the terminal device 100 receives the network setting information NS1 which the SP server 10 had most recently received from the printer 200 from the SP server 10 (32) and sends this network setting information NS1 to the printer 200 (T50). Due to this, the network setting information NS2 of the printer 200 is changed to the network setting information NS1. According to the above processes, the receipt of the state notification can be restarted at an early stage (156).

Figure 6:
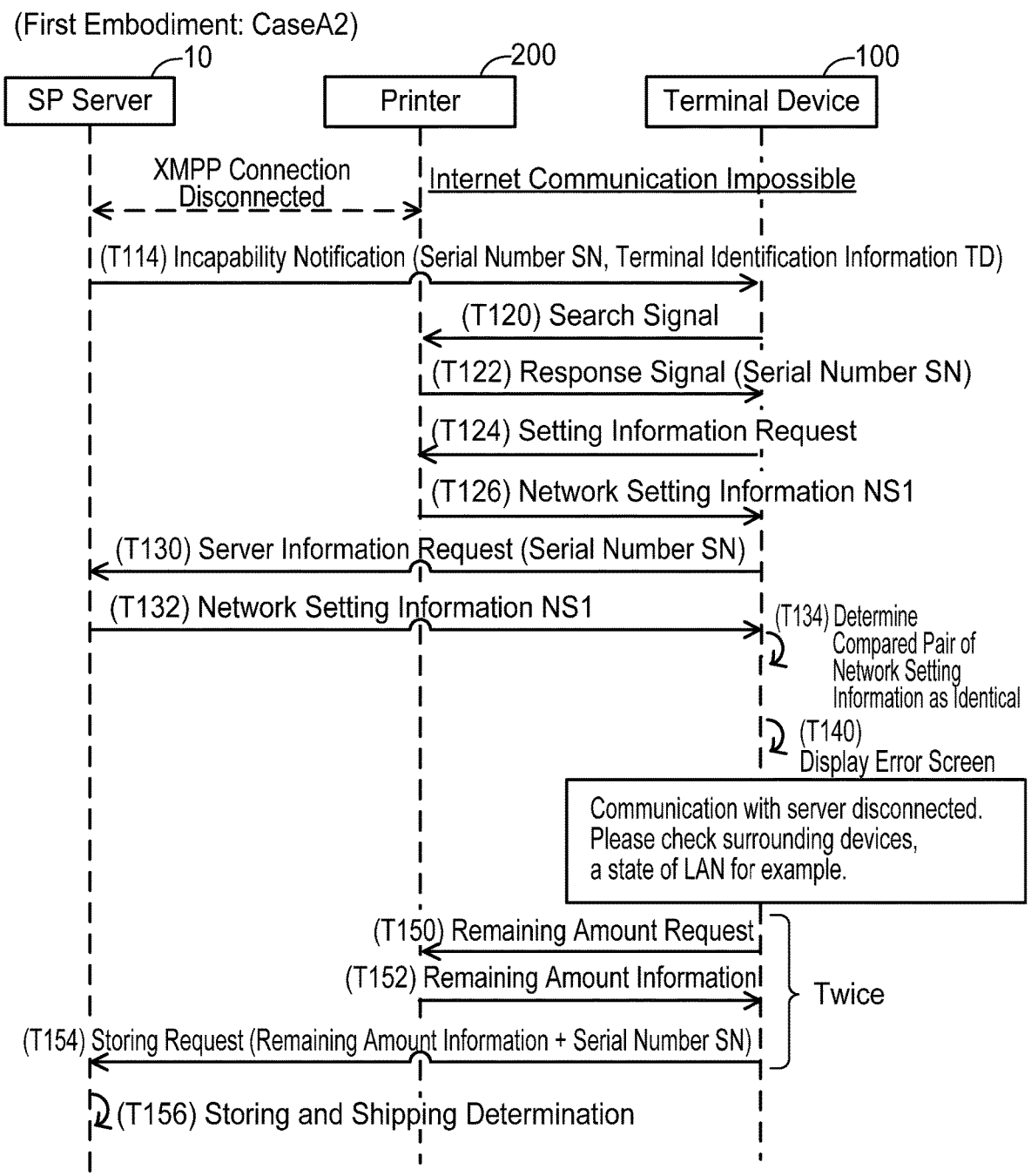
FIG. 6 shows specific Case A2 realized by the processes of FIGS. 3 and 4.

(Specific Case A2; FIG. 6)

Specific Case A2 realized by the processes of FIGS. 2 and 3 will be described with reference to FIG. 6. FIG. 6 is a continuation from FIG. 2. In this case, unlike Case A1 of FIG. 5, the printer 200 becomes incapable of executing communication through the Internet 6 due to a reason other than a part of the network setting information NS1 of the printer 200 having been changed (such as changing the setting of the access point of the LAN 4). Due to this, the XMPP connection with the SP server 10 is disconnected and the periodic sending of the state notification can no longer be executed.

T114 to T124 are similar to T14 to T24 of FIG. 5. T126 is similar to T26 of FIG. 5 except that the network setting information NS currently stored in the printer 200 is received from the printer 200.

T130 and T132 are similar to T30 and T32 of FIG. 5. In T134, the terminal device 100 determines that the network setting information NS1 received from the printer 200 and the network setting information NS1 received from the SP server 10 are identical (YES to S60).

In T140, the terminal device 100 displays the error screen (80 of FIG. 4). In T150, the terminal device 100 sends the remaining amount request to the printer 200 and in T152, the terminal device 100 receives the current remaining amount information from the printer 200 (S82).

In T152, the terminal device 100 sends the storing request including the serial number SN and the remaining amount information received in T152 to the SP server 10 (S84). Processes from T150 to T154 are executed repeatedly just twice, which is the predetermined number of times.

When the storing request is received from the terminal device 100 in T154 (NO to S30 of FIG. 3), the SP server 10 stores the remaining amount information included in the storing request as the history information HI associated with the serial number SN in the device table 32 (S36). Then, the SP server 10 executes the determination on whether to execute the shipping process.

According to the present case, the terminal device 100 does not send the network setting information NS1 received from the SP server 10 to the printer 200 in the case of determining that the network setting information NS1 received from the printer 200 and the network setting information NS1 received from the SP server 10 are identical (T134). As aforementioned, in the present case, the periodic reception of the state notification is stopped due to a reason other than a part of the network setting information NS1 of the printer 200 having been changed. According to the present case, unnecessary sending of the network setting information NS1 to the printer 200 can be suppressed.

Further, according to the present case, the terminal device 100 sends the storing request including the current remaining amount information of the printer 200 to the SP server 10 (T154). By doing so, even in a case where the periodic reception of the state notification from the printer 200 cannot be restarted, the terminal device 100 can send the current remaining amount information of the printer 200 to the SP server 10 on behalf of the printer 200. Due to this, even in the case where the periodic reception of the state notification from the printer 200 cannot be restarted, the service of shipping an ink cartridge to the user can be provided.

(Corresponding Relationship)

The SP server 10, the printer 200, and the terminal device 100 are respectively an example of a "server", a "communication device", and a "terminal device". The remaining amount information and the ink cartridge are respectively an example of "operation information" and a "consumable article". The network setting information NS1 and the network setting information NS2 are respectively an example of "first setting information" and "second setting information". The incapability notification is an example of an "execution instruction". The selection screen in S62 of FIG. 4 is an example of a "selection screen".

Y36 of FIG. 2 is an example of "receive operation information". S12 of FIG. 3 is an example of "send an execution instruction". The reception of the incapability notification as the trigger of the process of FIG. 4 is an example of "receive an execution instruction". S58 and S68 of FIG. 4 are examples of "execute the specific process".

Second Embodiment (Process of Terminal Device; FIG. 4)

The present embodiment is similar to the first embodiment except that a part of the process of FIG. 4 is different. The process of FIG. 4 is similar to the first embodiment except that a content of S54 is different and the process of S82 is omitted.

In S54, the CPU 122 receives the network setting information and the current remaining amount information of the target printer from the target printer through the communication/F 112.

Further, when the error screen is displayed on the display unit 114 in S80, the CPU 122 sends the storing request including the current remaining amount information received in S54 to the SP server 10 in S4.

In the first embodiment, in the situation in which the periodic reception of the state notification becomes no longer possible due to a reason other than a part of the network setting information NS1 of the printer 200 having been changed, the terminal device 100 sends the request to the printer 200 twice (that is, the setting information request in S52 and the remaining amount request in S82). Contrary to this, in the configuration of the present embodiment, the terminal device 100 sends the request to the printer 200 once (that is, the setting information request in S52). A number of times the terminal device 100 and the printer 200 communicate can be reduced.

Third Embodiment

Figure 7:
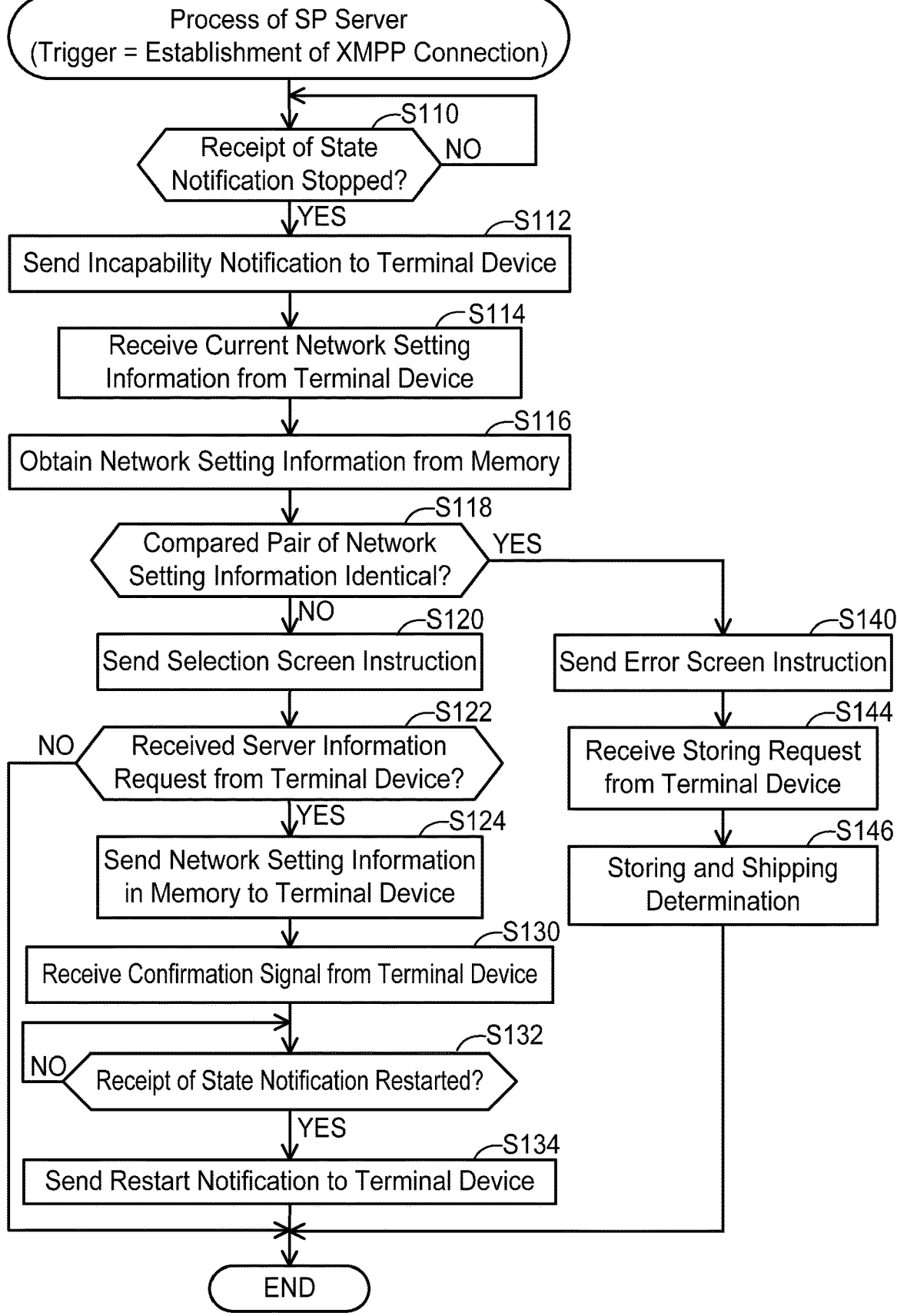
FIG. 7 shows a flowchart of process of a service provision server of a third embodiment.
Figure 8:
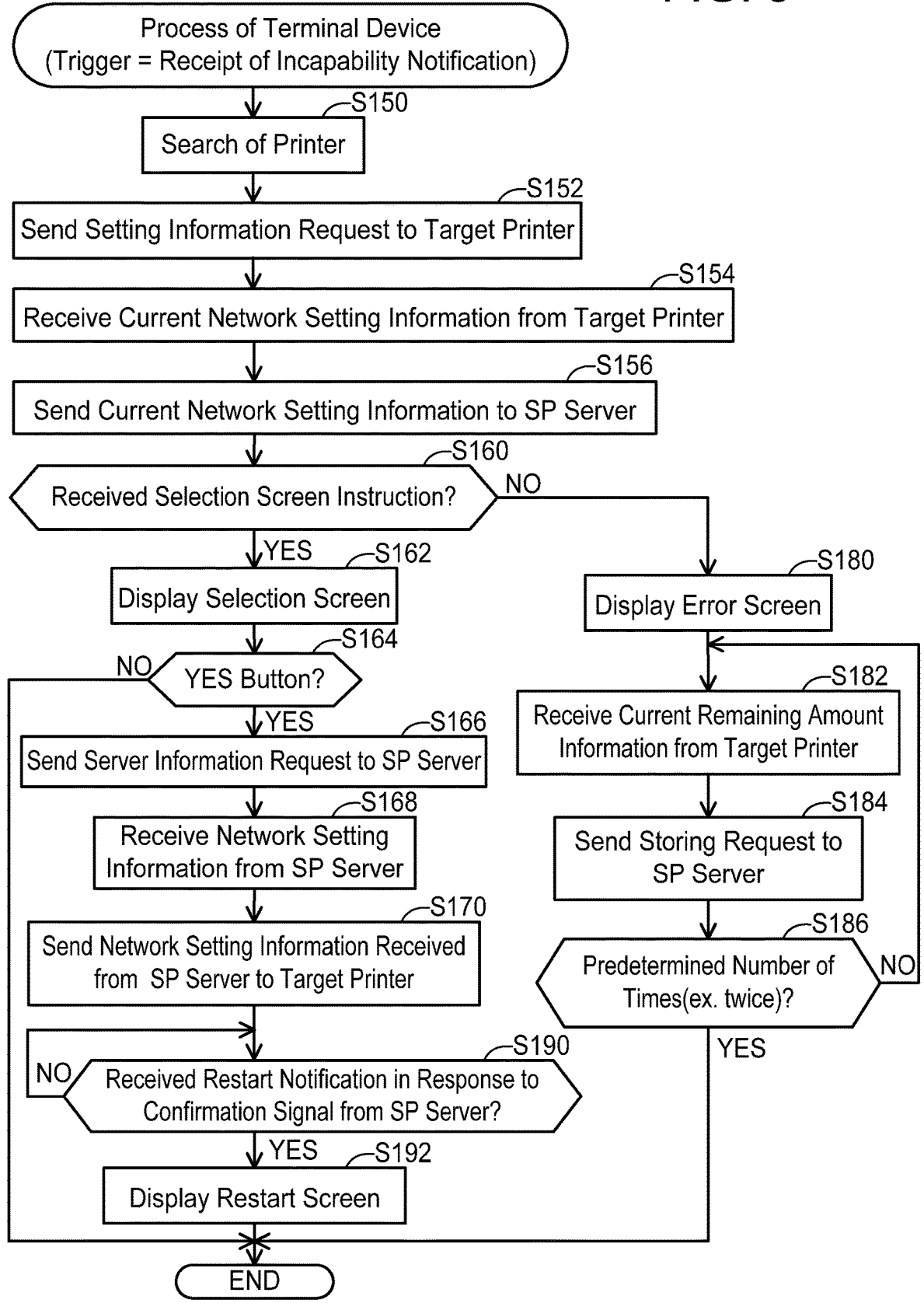
FIG. 8 shows a flowchart of process of a terminal device of the third embodiment.

The present embodiment is similar to the first embodiment except that process of FIG. 7 is executed instead of the process of FIG. 3 and process of FIG. 8 is executed instead of the process of FIG. 4.

(Process of SP Server; FIG. 7)

Process executed by the CPU 22 of the SP server 10 will be described with reference to FIG. 7. A trigger for the process of FIG. 7 is similar to the trigger of the process of FIG. 3. S110 and S112 are similar to S10 and S12 of FIG. 3. Here, when the incapability notification is received from the SP server 10 by the process of S112, the terminal device 100 executes processes similar to S50 to S54 of FIG. 4 and receives network setting information that is currently stored in the printer 200 (hereinbelow termed "current network setting information") from the printer 200.

In S114, the CPU 22 receives the current network setting information of the printer 200 from the terminal device 100 through the communication I/F 12.

In S116, the CPU 22 obtains the network setting information NS1 stored in association with the serial number SN that identifies the printer 200 from the device table 32 in the memory 24 (that is, the network setting information NS1 which the SP server 10 most recently received from the printer 200).

In S118, the CPU 22 determines whether the current network setting information and the network setting information NS1 obtained from the device table 32 are identical. In a case of determining that this pair of network setting information is different (NO to S118), the CPU 22 proceeds to S120.

In S120, the CPU 22 sends a selection screen instruction indicating an instruction to display the selection screen to the terminal device 100 through the communication I/F 12. Here, when the selection screen instruction is received from the SP server 10 by the process of S120, the terminal device 100 executes a process similar to S62 of FIG. 4. Then, in the case where the YES button in the selection screen is selected, the terminal device 100 sends the server information request to the SP server 10. On the other hand, in the case where the NO button in the selection screen is selected, the terminal device 100 does not send the server information request to the SP server 10.

In S122, the CPU 22 determines whether the server information request has been received from the terminal device 100 through the communication I/F 12. In a case of determining that the server information request has been received from the terminal device 100 (YES to S122), the CPU 22 proceeds to S124. On the other hand, in a case of determining that the server information request has not been received from the terminal device 100 (NO to S122), the CPU 22 skips processes from S124 and terminates the process of FIG. 7.

In S124, the CPU 22 sends the network setting information NS1 obtained from the device table 32 in S118 to the terminal device 100 through the communication I/F 12. Here, when the network setting information NS1 is received from the SP server 10 by the process of S124, the terminal device 100 sends the network setting information NS1 to the printer 200 similar to S68 of FIG. 4. Then, the terminal device 100 sends the confirmation signal to the SP server 10.

In S130, the CPU 22 receives the confirmation signal from the terminal device 100 through the communication I/F 12. S132 and S134 are similar to S32 and S34 of FIG. 3. When the process of S134 is completed, the process of FIG. 7 is terminated.

Further, in a case of determining that the pair of network setting information is identical (YES to S118), the CPU 22 sends an error screen instruction being an instruction to display the error screen to the terminal device 100 in S140. Here, when the error screen instruction is received from the SP server 10 by the process of S140, the terminal device 100 executes processes similar to S80 to S86 of FIG. 4.

In S144, the CPU 22 receives the storing request including the current remaining amount information of the printer 200 from the terminal device 100 through the communication I/F 12. S146 is similar to S36 of FIG. 3. When the process of S146 is completed, the process of FIG. 7 is terminated.

(Process of Terminal Device; FIG. 8)

Process executed by the CPU 122 of the terminal device 100 will be described with reference to FIG. 8. A trigger for the process of FIG. 8 is similar to the trigger of the process of FIG. 4. S150 and S152 are similar to S50 and S52 of FIG. 4. S154 is similar to S54 in the first embodiment.

In S156, the CPU 122 sends the current network setting information received from the target printer (that is, the printer 200) in S154 to the SP server 10 through the communication I/F 112 (see S114 of FIG. 7).

In S160, the CPU 122 determines whether the selection screen instruction has been received from the SP server 10 through the communication I/F 112 (see S120 of FIG. 7). In a case of determining that the selection screen instruction has been received from the SP server 10 (YES to S160), the CPU 122 displays the selection screen on the display unit 114 in S162.

S164 is similar to S64 of FIG. 4. The CPU 122 proceeds to S166 in a case of determining that the YES button has been selected (YES to S164), and in a case of determining that the NO button has been selected (NO to S164), it skips processes from S166 and terminates the process of FIG. 8. S166 and S168 are similar to S56 and S58 of FIG. 4. S170, S190, and S192 are similar to S68, S90, and S92 of FIG. 4. When the process of S192 is completed, the process of FIG. 8 is terminated.

Further, in a case of determining that the error screen instruction has been received from the SP server 10 (NO to S160), the CPU 122 displays the error screen on the display unit 114 in S180. S182 to S186 are similar to S82 to S86 of FIG. 4. When the process of S186 is completed, the process of FIG. 8 is terminated.

Figure 9:
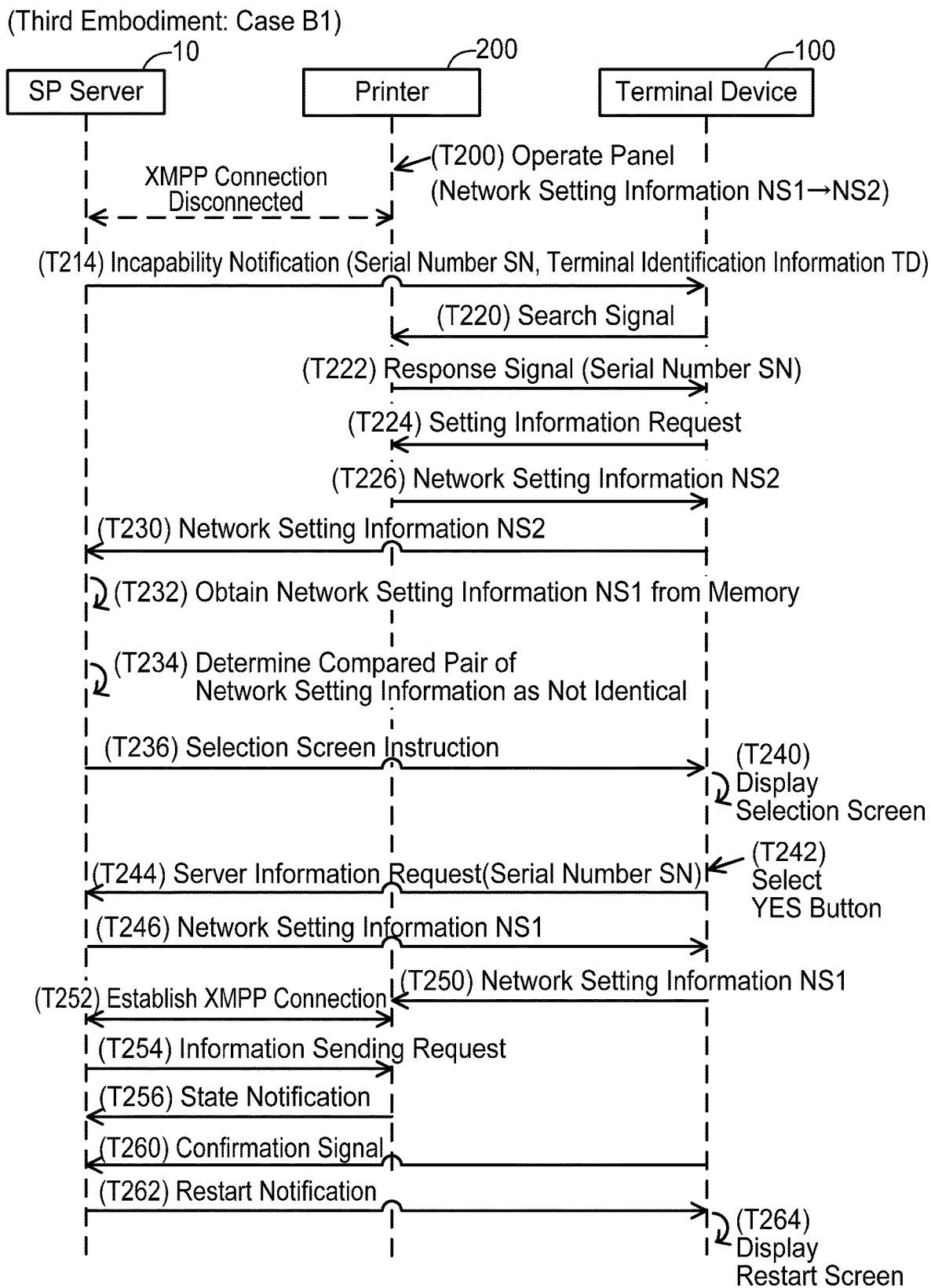
FIG. 9 shows specific Case B1 realized by the processes of FIGS. 7 and 8.

(Specific Case B1; FIG. 9)

Specific Case B1 realized by the processes of FIGS. 7 and 8 will be described with reference to FIG. 9. FIG. 9 is a continuation from FIG. 2. T200 to T226 are similar to T10 to T26 of FIG. 5.

In T230, the SP server 10 receives the current network setting information NS2 of the printer 200 from the terminal device 100 (S114 of FIG. 7).

In 1232, the SP server 10 obtains the network setting information NS1 from the device table 32 in the memory 24 (S116 of FIG. 7).

In T234, the SP server 10 determines that the current network setting information NS2 received from the terminal device 100 and the network setting information NS1 obtained from the device table 32 are different (NO to S118 of FIG. 7).

In T236, the SP server 10 sends the selection screen instruction to the terminal device 100 (S120 of FIG. 7).

When the selection screen instruction is received from the SP server 10 in T236, the terminal device 100 displays the selection screen in T240 (S162 of FIG. 8). T242 is similar to T42 of FIG. 5.

In T244, the terminal device 100 sends the server information request to the SP server 10 (S166 of FIG. 8). In T246, the terminal device 100 receives the network setting information NS1 from the SP server 10 (S168). T250 to 264 are similar to T50 to T64 of FIG. 5. In this case as well, the reception of the state notification can be restarted at an early stage similarly to Case A1 of FIG. 5.

Figure 10:
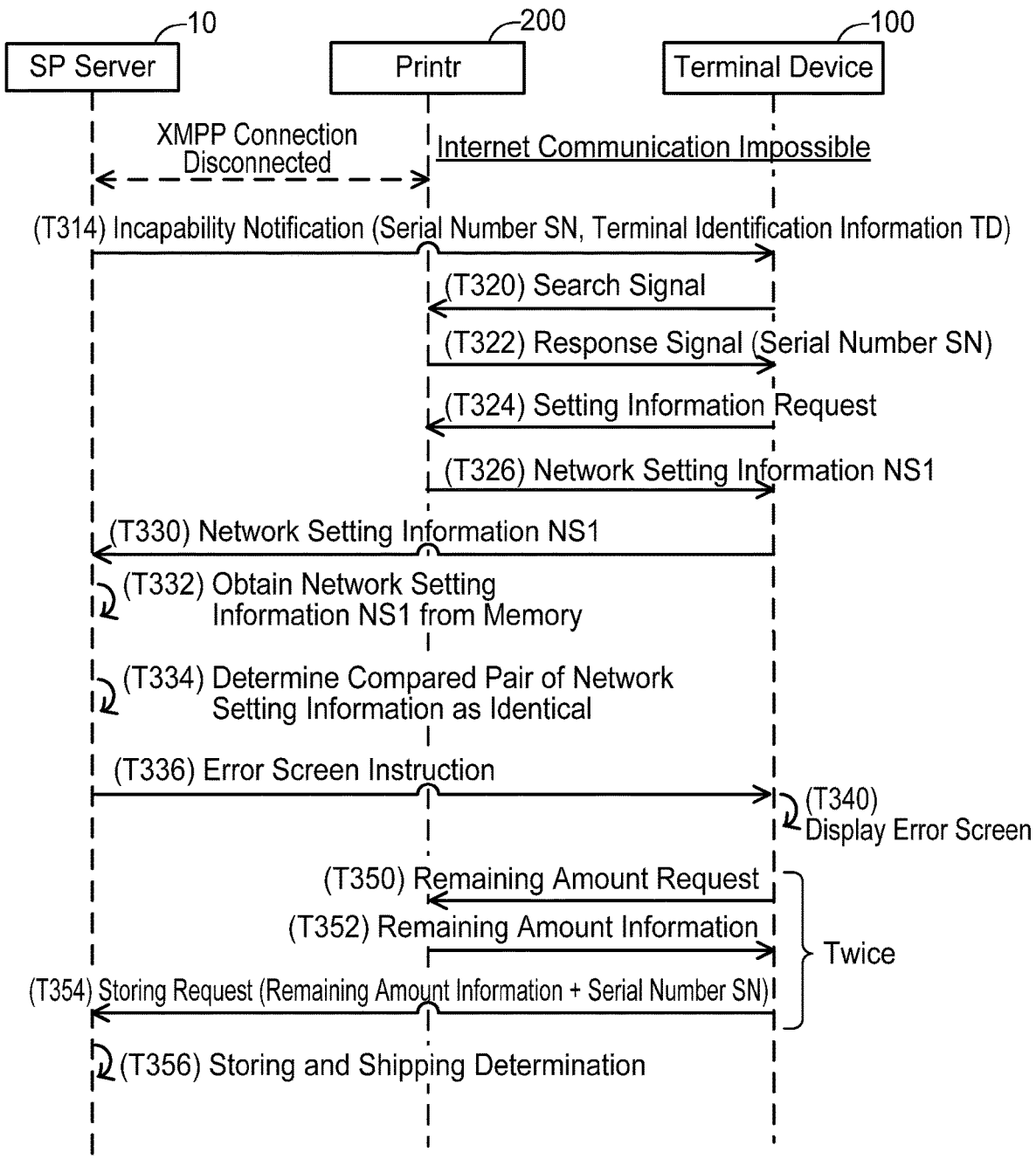
FIG. 10 shows specific Case B2 realized by the processes of FIGS. 7 and 8.

(Specific Case B2; FIG. 10)

Specific Case B2 realized by the processes of FIGS. 7 and 8 will be described with reference to FIG. 10. FIG. 10 is a continuation from FIG. 2. T314 to T326 are similar to T114 to T126 of FIG. 6.

In T330, the SP server 10 receives the current network setting information NS1 of the printer 200 from the terminal device 100 (S114 of FIG. 7).

In T332, the SP server 10 obtains the network setting information NS1 from the device table 32 in the memory 24 (S116 of FIG. 7).

In T334, the SP server 10 determines that the current network setting information NS1 received from the terminal device 100 and the network setting information NS1 obtained from the device table 32 are identical (YES to S118 of FIG. 7).

In T336, the SP server 10 sends the error screen instruction to the terminal device 100 (S140 of FIG. 7). T340 to T356 are similar to T140 to T156 of FIG. 6.

According to the present case, the SP server 10 does not send the network setting information NS1 to the terminal device 100 in the case of determining that the current network setting information NS1 received from the terminal device 100 and the network setting information NS1 obtained from the device table 32 are identical (334). As aforementioned, in the present case, the periodic reception of the state notification has stopped due to a reason other than a part of the network setting information NS1 of the printer 200 having been changed. According to the present case, the unnecessary sending of the network setting information NS1 to the terminal device 100 can be suppressed.

(Corresponding Relationship) S112 of FIG. 7 is an example of a process realized by "send an execution instruction". The reception of the incapability notification as the trigger of the process of FIG. 8 is an example of "receive an execution instruction". S168 and S170 of FIG. 8 are examples of "execute the specific process".

(Variant 1) The "operation information" is not limited to the remaining amount information, and may be a number of times printing was executed in the printer 200. Further, the "communication device" is not limited to the printer 200, and may be a scanner, a multi-function peripheral, or a PC. Here, in a case where the "communication device" is the scanner, the "operation information" may for example be a number of times scan was executed. Further, in a case where the "communication device" is the PC, the "operation information" may for example be an available capacity of a memory of the PC.

(Variant 2) The "consumable article" is not limited to the ink of the ink cartridge, and may be toner of a toner cartridge.

(Variant 3) The processes of S52, S54, and S60 of FIG. 4 may not be executed. In this case, the terminal device 100 may send the network setting information NS1 to the target printer in the case of receiving the network setting information NS1 from the SP server 10 (S58). The target printer may determine, when the network setting information NS1 is received from the terminal device 100, whether the network setting information NS1 received from the terminal device 100 and the current network setting information currently stored in the target printer are identical. Further, in the case of determining that this pair of network setting information is identical, the target printer may execute the process for establishing the XMPP connection with the SP server 10. In this variant, "receiving, from the communication device, second setting information currently stored in the communication device" may be omitted.

(Variant 4) The processes of S36 of FIG. 3 and S82 to S86 of FIG. 4 may not be executed. In this variant, "the terminal device sending current operation information of the communication device to the server on behalf of the communication device" and "receive the current operation information" may be omitted.

(Variant 5) The processes of S62 and S64 of FIG. 4 may not be executed. In this variant, "selection screen" may be omitted.

(Variant 6) In the above embodiments, the respective processes of FIGS. 2 to 10 are realized by the CPU 22 of the SP server 10 and the CPU 122 of the terminal device 100 executing the programs 26, 126, 128 (that is, software). Alternatively, one or more of the processes may be realized by hardware such as a logic circuit.

What is claimed is:

1. A server comprising:
a processor, and
a memory storing computer-readable instructions therein,
wherein the computer-readable instructions, when executed by the processor, cause the server to:
receive operation information of a communication device and setting information from the communication device repeatedly, the setting information indicating a setting for the communication device to communicate with the server; and
in a case where the server is not capable of receiving the operation information and the setting information from the communication device, send an execution instruction for executing a specific process to a terminal device being different from the communication device, the specific process including the terminal device receiving, from the server, first setting information which the server most recently received from the communication device, and sending the first setting information to the communication device.

2. The server as in claim 1, wherein
the specific process further includes the terminal device receiving, from the communication device, second setting information currently stored in the communication device,
in a case where the first setting information is not identical to the second setting information, the first setting information is sent from the terminal device to the communication device, and
in a case where the first setting information is identical to the second setting information, the first setting information is not sent to the communication device.

3. The server as in claim 2, wherein
the computer-readable instructions, when executed by the processor, further cause the server to:
receive the second setting information from the terminal device after the terminal device has received the second setting information from the communication device;
in a case where the second setting information is received from the terminal device, determine whether the first setting information is identical to the second setting information; and
in a case where it is determined that the first setting information is not identical to the second setting information, send the first setting information to the terminal device,
wherein in a case where it is determined that the first setting information is identical to the second setting information, the first setting information is not sent to the terminal device.

4. The server as in claim 2, wherein
the specific process further includes, in the case where the first setting information is identical to the second setting information, the terminal device sending current operation information of the communication device to the server on behalf of the communication device, and
the computer-readable instructions, when executed by the processor, further cause the server to:
in the case where the first setting information is identical to the second setting information, receive the current operation information from the terminal device.

5. The server as in claim 4, wherein
the current operation information is sent together with the second setting information from the communication device to the terminal device.

6. The server as in claim 1, wherein
the specific process further includes the terminal device displaying a selection screen for selecting whether the first setting information is to be sent to the communication device, and
in a case where it is selected in the selection screen that the first setting information is to be sent to the communication device, the first setting information is sent from the terminal device to the communication device.

7. The server as in claim 1, wherein
the operation information includes information indicating a usage status of a consumable article currently mounted in the communication device.

8. A non-transitory computer-readable medium storing computer-readable instructions for a terminal device, wherein the computer-readable instructions, when executed by a processor of the terminal device, cause the terminal device to:
in a case where a server is not capable of receiving operation information of a communication device being different from the terminal device and setting information from the communication device after the server has received the operation information and the setting information from the communication repeatedly, the setting information indicating a setting for the communication device to communicate with the server, receive an execution instruction for executing a specific process from the server; and
in a case where the execution instruction is received from the server, execute the specific process in accordance with the execution instruction, the specific process including receiving, from the server, first setting information which the server most recently received from the communication device and sending the first setting information to the communication device.

9. The non-transitory computer-readable medium as in claim 8, wherein the specific process further includes the terminal device receiving, from the communication device, second setting information currently stored in the communication device, in a case where the first setting information is not identical to the second setting information, the first setting information is sent from the terminal device to the communication device, and in a case where the first setting information is identical to the second setting information, the first setting information is not sent to the communication device.

10. The non-transitory computer-readable medium as in claim 9, wherein the specific process further includes, in a case where the second setting information is received form the communication device, the terminal device determining whether the first setting information is identical to the second setting information, in a case where it is determined that the first setting information is not identical to the second setting information, the first setting information is sent from the terminal device to the communication device, and in a case where it is determined that the first setting information is identical to the second setting information, the first setting information is not sent to the communication device.

11. The non-transitory computer-readable medium as in claim 9, wherein the specific process further includes, in a case where the first setting information is identical to the second setting information, the terminal device sending current operation information of the communication device to the server on behalf of the communication device.

12. The non-transitory computer-readable medium as in claim 11, wherein the current operation information is sent together with the second setting information from the communication device to the terminal device.

13. The non-transitory computer-readable medium as in claim 8, wherein the specific process further includes the terminal device displaying a selection screen for selecting whether the first setting information is to be sent to the communication device, and in a case where it is selected in the selection screen that the first setting information is to be sent to the communication device, the first setting information is sent from the terminal device to the communication device.

14. The non-transitory computer-readable medium as in claim 8, wherein the operation information includes information indicating a usage status of a consumable article currently mounted in the communication device.

15. A non-transitory computer-readable medium storing computer-readable instructions for a server, wherein the computer-readable instructions, when executed by a processor of the server, cause the server to:

receive operation information of a communication device and setting information from the communication device repeatedly, the setting information indicating a setting for the communication device to communicate with the server; and in a case where it is not capable of receiving the operation information and the setting information from the communication device, send an execution instruction for executing a specific process to a terminal device being different from the communication device, the specific process including the terminal device receiving, from the server, first setting information which the server most recently received from the communication device, and sending the first setting information to the communication device.

* * * * *